United States Patent [19]

Nicholas et al.

[11] 3,852,311

[45] Dec. 3, 1974

[54] ERGOSTERYL ESTERS HAVING LIQUID CRYSTALLINE PROPERTIES

[76] Inventors: Harold J. Nicholas, 12456 Merrick Dr., Creve Coeur, Mo. 63141; Furn F. Knapp, Jr., 6700 Torlina Dr., Berkeley, Mo. 63134

[22] Filed: July 3, 1972

[21] Appl. No.: 268,572

Related U.S. Application Data

[63] Continuation of Ser. No. 36,449, May 11, 1970.

[52] U.S. Cl. ............................................ 260/397.2
[51] Int. Cl. ......................................... C07c 169/54
[58] Field of Search .................................................
/Machine Searched Steroids

[56] References Cited
UNITED STATES PATENTS

| | | | |
|---|---|---|---|
| 2,128,198 | 8/1938 | Windaus | 260/397 |
| 2,813,879 | 11/1957 | Wildi et al. | 260/397.2 |

OTHER PUBLICATIONS

Fieser et al., Steroids, pages 28, 100 & 101, Reinhold Pub. Co., (1959).
Gray, Molecular Structure and the Properties of Liquid Crystals, pgs. 1–6 & 188–197, (1962).
Chem. & Eng. News, Nov. 1, 1971, pages 20–23.

*Primary Examiner*—Henry A. French
*Attorney, Agent, or Firm*—Gravely, Lieder & Woodruff

[57] ABSTRACT

The chemical synthesis of the homologous series of fatty acid esters of the sterol ergosterol is described. Primarily even chain and several odd-chain esters were prepared and showed liquid crystalline properties with the polarizing microscope. Esters of chain length intermediate between the acetate and stearate form a smectic liquid crystalline trasition state.

3 Claims, No Drawings

ERGOSTERYL ESTERS HAVING LIQUID CRYSTALLINE PROPERTIES

This is a continuation of application Ser. No. 36,449 filed May 11, 1970.

The cholesteryl fatty acid esters represent a thoroughly studied class of mesomorphic substances. Many of these esters are polymorphic and form both a smectic and a cholesteric mesophase. The cholesteryl n-alkyl carbonates also form a cholesteric mesophase. Investigators have found certain stigmasteryl fatty acid esters to form monotropic smectic transitions by rapidly cooling the isotropic melts of these esters. Various fatty acyl esters of β-sitosterol and stigmasteryl n-alkyl carbonates and n-alkyl thiocarbonates form a smectic mesophase. In addition, the mesomorphic properties of a number of carbonates and thiocarbonates of cholesterol and cholestanol are known. These include 5α-cholestanyl n-alkyl carbonates, 5α-cholestanyl S-alkyl thiocarbonates, S-cholesteryl O-alkyl thiocarbonates, cholesteryl S-alkyl thiocarbonates, S-cholesteryl S-alkyl thiocarbonates, cholesteryl xanthanates and cholesteryl trithiocarbonates.

However, until this invention ergosteryl esters were not known to behave as liquid crystals.

This invention relates to the synthesis, purification and properties of fatty acid esters of ergosterol which behave as smectic liquid crystals. Thirteen fatty acid esters of ergosterol were prepared and their liquid crystalline properties studied with the polarizing microscope. Ergosteryl acetate is not mesomorphic. Saturated even-chain esters from the butyrate to the laurate form enaniotropic smectic transitions. The myristate and palmitate form monotropic transitions, the smectic meophase being formed only upon cooling the isotropic liquid. The stearate also forms a monotropic transitions, the smectic mesophase being formed below the melting point. The heptanoate, nonanoate and tridecanoate odd-chain esters also form the enaniotropic transitions. An odd-even effect on the liquid crystalline properties is observed in this series of esters.

The principle object of this invention is to provide new smectic liquid crystals. Another object of this invention is to provide a series of liquid crystals that further the study of the relationship between structure and these properties. Still another object is to provide smectic liquid crystals for use in electronics and other technical applications. Other objects will become apparent from the detailed description of the invention that follows.

The invention described herein may be used for a number of useful applications. Such substances may be used in gas-liquid chromatography as stationary phase materials. In addition, the phase changes of such substances are also sensitive to electronic field effects and these substances are important for use in display systems. Also, the properties of these substances may be studied as model systems in the development of theories regarding their possible function in living organisms.

The objects of this invention are achieved by the synthesis of esters of ergosterol. The esters were prepared, purified and stored in the dark to minimize degradation due to irradiation. Esters were prepared by esterification of 200 mg of ergosterol with a 1.5 molar excess of the acyl chloride in 100 ml of anhydrous benzene containing 3 ml of pyridine. The solution was refluxed under anhydrous conditions for one half hour. After allowing it to cool to room temperature, 100 ml of ether was added and the solution was washed three times with equal volumes of 10 percent hydrochloric acid, three times with 5 percent potassium hydroxide, followed by three washes with water. The organic layer was dried with anhydrous sodium sulfate and the solvent evaporated on a steam bath under a stream of nitrogen. The residue was dissolved in benzene and then added to an alumina column (30 × 1.5 cm) containing the Merck acid-washed absorbent (15 gm). The ester was eluted with 300 ml of benzene and crystallized four times from methanol-ether. Thin-layer and gas-liquid partition chromatography were employed to further establish the purity of the crystalline esters. The purified esters were chromatographed on 250μ thick layers of silica gel G. The solvent system was ether-hexane, 7:93 (v/v). The spots were visualized by spraying the plates with anisaldehyde reagent and then heating them at 80°. The esters could be separated in this system according to fatty acyl chain length. Representative $R_f$'s are as follows: ergosteryl acetate, $R_f$ 0.38; hexanoate, $R_f$ 0.58; palmitate, $R_f$ 0.67. Gas-liquid chromatography was carried out using a Barber-Colman Model 5000 gas chromatograph equipped with a hydrogen flame detector. A 60 cm long glass column (4 mm i.d.) was packed with Gas Chrom Q (100/120 mesh, Applied Science Laboratorities) and coated with 1 percent SE-30. The column was conditioned for 72 hrs. at 320° with the carrier gas ($N_2$) flowing at 150 cc/min. (thermal stripping). The column was operated at 290° with an $N_2$ flow rate of 150 cc/min.

Melting points and phase transition temperatures were determined using a Nalge-Axelrod hot-stage polarizing microscope. Samples were sandwiched between glass cover-slips and were heated at a rate of 3°/min. and cooled at a rate of 2°/min. The melting point is defined as the temperature at which the crystalline structure forms either the isotropic liquid or a birefringent liquid (mesophase). The smectic → isotropic transition temperature is the transition from the mesophase to the isotropic liquid. In all cases this temperature differed by no more than one degree from the isotropic → smectic transition temperature. This is another index of the purity of the preparations. Photographs were obtained with an Exakta 35 mm single lens reflex camera. With the 10X objective (50 diameters magnification) a 10 sec. exposure gave a sufficiently sharp photograph.

The following abbreviations and terms are used in this paper: sm = smectic mesophase; iso = isotropic liquid; enaniotropic = reversible transition, formed on both heating and cooling; monotropic = transition formed only on cooling the isotropic liquid.

The melting points obtained by us for ergosteryl fatty acid esters are tabulated in Table I.

TABLE I

Melting Points and Phase Transitions Temperatures of Ergosteryl Fatty Acid Esters

| Esters | Melting Point, °C | Observed Transition Temperature, °C |
|---|---|---|
| Acetate | 179–180 | . . . |
| Butyrate | 127 | iso → sm 142 |
| Isobutyrate | 153 | iso → sm 157 |

TABLE I—Continued

Melting Points and Phase Transitions Temperatures of Ergosteryl Fatty Acid Esters

| Esters | Melting Point, °C | Observed Transition Temperature, °C |
|---|---|---|
| Hexanoate | 119 | iso → sm 141.5 |
| Heptanoate | 94 | iso → sm 130 |
| Octanoate | 110 | iso → sm 137.5 |
| Nonanoate | 89–90 | iso → sm 131 |
| Decanoate | 109–110 | iso → sm 132 |
| Dodecanoate (Laurate) | 114 | iso → sm 127.5 |
| Tridecanoate | 103 | iso → sm 118.5 |
| Tetradecanoate (Myristate) | 115 | iso → sm 118 |
| hexadecanoate (Palmitate) | 109 | iso → sm 110 |
| Octadecanoate (Stearate) | 113 | iso → sm 104 |

The majority of these esters have a waxy texture near the melting point and melt to hazy, turbid liquids. This is especially true with ergosteryl octanoate. In such situations it is difficult to detect the true melting point. We define the melting point as the temperature at which the crystalline structure disappears. With a polarizing microscope we observed either the darkening of the field of view (isotropic liquid), or the change to a distinctly different birefringent pattern (mesophase).

The esters used for our determinations were of high purity as was demonstrated by gas-liquid partition chromatographic analyses. All of the esters exhibited a homogeneous peak with a steady baseline, indicating the absence of homologues. When the logarithm of the retention time in millimeters is plotted as a function of the fatty acyl chain length for the series of esters, a linear relationship is obtained, indicating a well-defined homologous series of substances. Gas-liquid chromatographic analyses using cholesteryl esters as the stationary phase have demonstrated the unusually high heats of solution of various organic solvents in these substances. These retained organic solvents which are not completely removed can dramatically affect the thermodynamic properties of mesomorphic substances. Although in such instances the melting point is usually not changed, the mesophase transition temperature can be drastically altered. An earlier preparation of ergosteryl palmitate had a sm → iso transition temperature 8° lower than that found in the present study, although the melting points were identical. For the esters described in this invention the samples were crystallized from methanol-ether and carefully dried in vacuo. Such a procedure hopefully eliminated these difficulties. A detailed description of the mesomorphic properties of these ergosteryl esters listed in Table I follows.

Ergosteryl Acetate

The crystalline structure melted directly to the isotropic liquid at 179°–180°. Upon cooling, no mesophase was detected, the melt crystallizing at 76°.

Ergosteryl Butyrate

Many focal-conic groups were observed upon heating the solid to 132°. At 142° the isotropic liquid formed, the fan-texture appearing upon cooling to this same temperature. The crystalline structure formed at 111°.

Ergosteryl Isobutyrate

This ester melted at 153° to a birefringent liquid. The mesophase consisted of crosses, many of which were surrounded by three concentric rings. The isotropic liquid appeared at 157°. Upon cooling, the fan-texture structure formed at 157° and the crystalline phase at 117°.

Ergosteryl Hexanoate

The crystals melted at 119° to a birefringent liquid containing many small focal-conic groups. At 127° larges crosses appeared in the mesophase, the isotropic liquid being formed at 141°. Upon cooling, a beautiful fan-texture (smectic type A morphology) formed at 142°. The crystalline solid appeared at 78°.

Ergosteryl Heptanoate

This ester melted at 94° to a highly birefringent liquid. The mesophase contained many small focal-conic groups which rearranged to the fan-texture at 115°. At 128° some spherulites appeared at the periphery of the melt, the isotropic liquid forming at 130°. Upon cooling, the fan-texture appeared at 129°, persisting until crystallization occured at 48°.

Ergosteryl Octanoate

Upon heating the crystals, a birefringent liquid appeared at 110°, consisting of small focal-conic groups. The isotropic liquid was formed at 138°. Large focal-conic groups invaded the melt upon cooling down to 137°. At 56° a crystalline front moved across the melt.

Ergosteryl Nonanoate

At 89°–90° the crystals melted to form many small focal-conics. Larger focal-conic groups formed at 118°, with spherulites at the periphery of the melt. At 130° the isotropic liquid appeared and at 131° on the cooling cycle the fantexture reformed. The crystalline phase was formed upon cooling to 47°.

Ergosteryl Decanoate

The crystals melted to the small focal-conic texture at 109°–110°. The texture consisted of small focal-conic groups and many crosses surrounded by three concentric rings, similar to the mesophase formed by the heptanoate. At 131° the isotropic liquid appeared. Upon cooling, the fan-texture was formed at 132° and the crystalline phase at 54°.

Ergosteryl Dodecanoate (Laurate)

This ester melted directly to the small focal-conic texture at 114°. At 120° the large focal-conic groups appeared and also many crosses with the three concentric rings. The isotropic liquid formed at 127° upon cooling, the fan-texture at 128°. The crystalline phase appeared at 59°.

Ergosteryl Tridecanoate

The small focal-conic texture formed at 102–103°, re-arranging to the large groups at 113° which disappeared to the isotropic liquid at 119°. Upon cooling, the fan-texture was formed at 118° and the crystalline structure at 52°.

Ergosteryl Tetradecanoate (Myristate)

This ester melted directly to the isotropic liquid at 115°. A monotropic fan-texture appeared upon cooling to 118° and the crystalline phase at 82°.

Ergosteryl Hexadecanoate (Palmitate)

The isotropic liquid appeared upon heating the crystalline structure to 109°. When cooled to 110° the fan-texture appeared. The crystalline phase formed at 102°.

Ergosteryl Octadecanoate (Stearate)

At 113° the crystals melted to an isotropic liquid. Upon cooling the melt to 104°, a fan-texture which contained many crosses was formed. A beautiful multicolored crystalline solid was formed at 81°.

When the melting points and isotropic → smectic transition temperatures of these ergosteryl esters are plotted as a function of fatty acyl chain length, there is a steady decrease in the *sm* → *iso* transition temperatures with increasing fatty acyl chain length. For the even-chain esters these values fall on a smooth curve as is the case with most homologous series of liquid crystalline compounds that have been studied. The values for the three odd-chain esters are somewhat displaced. Most of the ergosteryl esters described in this application form enaniotropic smectic transitions. Upon heating these esters, a birefringent liquid containing many small focal-conic groups is formed. At a higher temperature this mesophase re-arranges to form a texture containing many large crosses. These changes are not accompanied by a front moving across the melt, as is usually the case with mesophase → mesophase transition. Instead, the mesophase re-arranges within the melt. Thus, the assignment of polymorphic transitions to these microscopically observed changes should await calorimetric measurements. Upon cooling the isotropic melt of such esters, a very well-defined fan-texture (smectic type A morphology) forms within the melt. This mesophase then persists until crystallization. The mesophase formed by ergosteryl hexanoate illustrates the type of texture formed by these esters. Such enaniotropic transitions are depicted as:

Crystalline ⇌ Smectic ⇌ Isotropic Liquid In some instances the texture formed upon heating consisted of small crosses each surrounded by three concentric rings. These rings disappeared rapidly to form the large cross structure. Such an optical pattern may result from nucleation due to dust particles. For esters which formed a smectic mesophase only upon cooling from the isotropic liquid (tetradecanoate, hexadecanoate and octadecanoate) the monotropic transition is assigned.

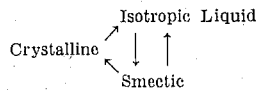

For these ergosteryl esters there is observed an odd-even effect on the liquid crystalline properties. For the cholesteryl ester series an odd-even effect is also found but the isotropic → smectic transition temperature of the odd-chain esters fall on a curve above that for the even-chain esters. In the case of the ergosteryl esters this effect is reversed, the odd-chain curve falling below that for the even-chain esters. Evidently the relative position of these curves with respect to one another may vary from case to case and is a reflection of the inherent thermodynamic properties of the particular series under study.

The following examples further illustrate this invention. Phase transitions were determined using a Nalge-Axelrod hot-stage polarizing microscope.

EXAMPLE 1

Ergosterol (200 mg) was refluxed for one half hour with a 1.5 molar excess of hexanoyl chloride in bezene as described. The purified ester crystallized as needles from methanol-ether, mp 119°. The ester had a smectic → isotropic transition temperature of 141.5°.

EXAMPLE 2

Ergosterol (200 mg) was refluxed with a 1.5 molar excess of palmitoyl chloride in the usual manner. The ester crystallized as flakes from methanol-ether, mp 109°, smectic → isotropic 118°.

EXAMPLE 3

Ergosteryl palmitate (100 mg) was reduced catalitically with hydrogen gas in ethyl acetate solution with $PtO_2$ by shaking at 40 psi for one hour. The resulting 24-methyl cholestanol palmitate crystallized from methanol-ether as flakes, mp 107°–108°, smectic → isotropic 85°.

What we claim is:

1. A method of preparing smectic liquid crystals of sterols selected from the group consisting of ergosterols and 24-methyl cholestanol comprising the steps of
   a. forming fatty acid esters of said sterols, said fatty acids having a chain length of $C_2$–$C_{30}$ and being selected from the group consisting of straight chain, branched chain, saturated, and unsaturated compounds,
   b. purifying said fatty acid esters,
   c. directing the temperature of the fatty acid esters toward the isotropic temperature, and
   d. forming liquid crystal structure in the smectic mesophase in said fatty acid esters,
   steps (a) and (b) being performed in the dark to minimize degradation due to irradiation.

2. The method of claim 1 including the steps of heating the fatty acid esters past the melting point to an isotropic liquid and cooling the said esters to form a liquid crystal structure in the smectic mesophase.

3. The method of claim 1 including the step of heating the fatty acid esters toward the isotropic temperature and recovering a liquid crystal in the smectic mesophase prior to reaching a isotropic liquid.

* * * * *